United States Patent
Brown

(10) Patent No.: US 9,534,621 B2
(45) Date of Patent: Jan. 3, 2017

(54) MATERIAL TRANSFER SYSTEM AND METHOD OF TRANSFERRING MATERIAL

(71) Applicant: James Randall Brown, Edgewood, NM (US)

(72) Inventor: James Randall Brown, Edgewood, NM (US)

( * ) Notice: Subject to any disclaimer, the term of this patent is extended or adjusted under 35 U.S.C. 154(b) by 268 days.

(21) Appl. No.: 14/019,531

(22) Filed: Sep. 5, 2013

(65) Prior Publication Data

US 2015/0059917 A1    Mar. 5, 2015

(51) Int. Cl.
*B65B 3/04* (2006.01)
*F16B 7/04* (2006.01)

(52) U.S. Cl.
CPC .................. *F16B 7/0426* (2013.01)

(58) Field of Classification Search
CPC ................................. F16B 7/0426
USPC ........... 141/1, 312, 331, 332, 346, 353, 354, 355,141/367, 368, 372, 383, 384, 385, 386
See application file for complete search history.

(56) References Cited

U.S. PATENT DOCUMENTS

| | | | | |
|---|---|---|---|---|
| 4,280,723 A | * | 7/1981 | Moldestad | F16L 37/113 285/376 |
| 4,392,513 A | * | 7/1983 | Parrish | F16L 55/1015 137/614.01 |
| 5,284,214 A | * | 2/1994 | Van Gundy, Sr. | F16L 25/00 175/320 |
| 5,597,021 A | * | 1/1997 | Crossdale | B67D 7/0288 137/590 |

(Continued)

FOREIGN PATENT DOCUMENTS

| | | |
|---|---|---|
| CA | 2674159 | 1/2011 |
| DE | 20 2012 100577 | 5/2012 |

(Continued)

OTHER PUBLICATIONS

RD 311117, Weaver, Abstract.

*Primary Examiner* — Timothy L Maust
*Assistant Examiner* — Andrew Schmid

(57) ABSTRACT

The material transfer system and method of transferring materials comprises provides improved connectors that overcome the deficiencies of the connectors currently used. The connector and method of connecting of the present invention comprises a fool-proof method of connecting and a method of ensuring the safe and accurate transfer of materials. The connector of the present invention provides a plurality of male and female connector portions in a plurality of geometric shapes and colors and specific key components that prevent the delivery of and mixing of incorrect and incompatible materials. The connectors of the present invention are shaped differently from any connectors currently available on the market. Each geometric shape corresponds to a general class of chemicals. One embodiment of the present invention connector is a color coded element according to the shape, size, and configuration of the connector and the material the connector is intended to transfer. The connector comprises a seal or "O" ring disposed on the connector that is chemically and mechanically compatible with the material being transferred. A marking or label that describes the material to be transferred is disposedly attached to the connector to improve safety and accuracy of the method of transfer of the material.

2 Claims, 10 Drawing Sheets

(56) References Cited

U.S. PATENT DOCUMENTS

| | | | | |
|---|---|---|---|---|
| 5,641,012 A * | 6/1997 | Silversides | A01C 15/006 | 137/846 |
| 5,720,328 A * | 2/1998 | Ott | B60K 15/04 | 141/301 |
| 5,765,610 A * | 6/1998 | Brown | B64D 37/16 | 137/614.06 |
| 5,779,277 A * | 7/1998 | Street | F16L 37/252 | 285/316 |
| 5,904,302 A * | 5/1999 | Brown | B64F 1/28 | 137/614.06 |
| 5,957,226 A * | 9/1999 | Holte | E21B 4/14 | 175/320 |
| 5,971,019 A * | 10/1999 | Imai | F16L 37/23 | 137/614.04 |
| 5,988,693 A * | 11/1999 | Street | F16L 37/18 | 285/312 |
| 6,206,431 B1 | 3/2001 | Street | | |
| 6,290,267 B1 * | 9/2001 | Swingley | F16L 37/18 | 137/614.06 |
| 6,715,514 B2 * | 4/2004 | Parker, III | G06Q 10/08 | 141/1 |
| 6,739,577 B2 * | 5/2004 | Clancy | F16L 37/23 | 251/149.6 |
| 6,786,247 B1 | 9/2004 | Kemppainen | F04B 33/005 | 137/223 |
| 6,938,651 B1 * | 9/2005 | Carter | B60H 1/00585 | 141/383 |
| 7,635,013 B2 * | 12/2009 | Ballinger | B67C 11/00 | 141/331 |
| 7,686,037 B2 * | 3/2010 | Krywitsky | F16L 37/244 | 137/614.04 |
| 7,980,599 B2 | 7/2011 | Schindel | | |
| 7,997,457 B1 * | 8/2011 | Phillips | B01F 15/042 | 222/1 |
| 8,083,265 B1 * | 12/2011 | Chen | F16L 37/18 | 285/312 |
| 8,162,013 B2 * | 4/2012 | Rosenquist | A61M 39/10 | 141/346 |
| 2004/0084107 A1 * | 5/2004 | Guest | F16L 37/0985 | 141/346 |
| 2007/0257484 A1 * | 11/2007 | Schindel | F16L 37/28 | 285/93 |
| 2010/0108184 A1 * | 5/2010 | Cuzydlo | A61M 16/183 | 141/18 |
| 2010/0289260 A1 * | 11/2010 | Morton | F16L 23/036 | 285/312 |
| 2010/0294276 A1 * | 11/2010 | Rindy | A61M 16/183 | 128/203.12 |
| 2011/0048692 A1 * | 3/2011 | Ross | E21B 47/01 | 166/66 |
| 2012/0199246 A1 * | 8/2012 | Budzyk | B60K 15/04 | 141/383 |
| 2012/0267006 A1 * | 10/2012 | Liao | B67C 11/02 | 141/331 |
| 2013/0167977 A1 * | 7/2013 | Vervoort | B05B 9/0833 | 141/346 |
| 2013/0269833 A1 * | 10/2013 | Eyre | B67C 11/00 | 141/332 |
| 2013/0327439 A1 * | 12/2013 | Pitney | F17C 5/06 | 141/346 |
| 2014/0162487 A1 * | 6/2014 | Frederick | H01R 13/187 | 439/370 |
| 2014/0246839 A1 * | 9/2014 | Hebenstreit | B62D 1/20 | 280/124.125 |
| 2015/0059917 A1 * | 3/2015 | Brown | F16B 7/00 | 141/1 |

FOREIGN PATENT DOCUMENTS

| | | |
|---|---|---|
| EP | 0200254 | 11/1986 |
| FR | 2725493 | 4/1996 |
| WO | WO 90/03329 | 4/1990 |
| WO | WO 97/35142 | 9/1997 |

* cited by examiner

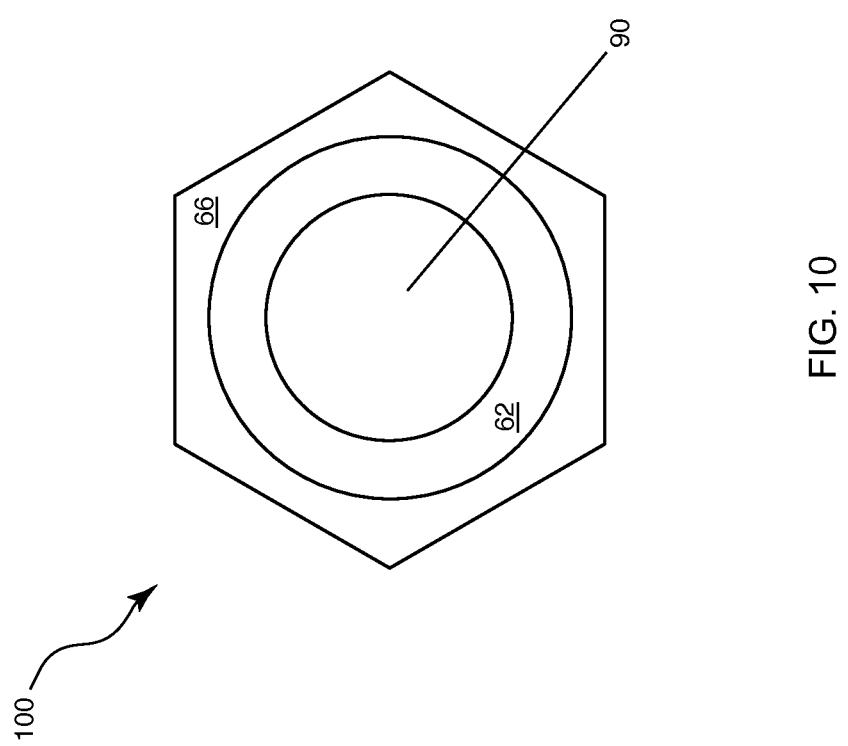

MATERIAL TRANSFER SYSTEM AND METHOD OF TRANSFERRING MATERIAL

CROSS-REFERENCE TO RELATED APPLICATIONS

This application claims the benefit of U. S. Provisional Application No. 61/697,664 filed Sep. 6, 2012 and the entire content is incorporated by reference herein and made part of this specification.

BACKGROUND OF THE INVENTION

Field of the Invention (Technical Field)

The present invention relates to a material transfer system and method of transfer comprising a connector and a method of connecting for the safe, efficient, and effective transfer of liquids, gases, or other materials to a container designed to hold any of a plurality of materials.

An existing method of transferring materials from a pump or transportation device such as a truck, tote, or drum is to attach the transportation device or pump to an on-site storage tank using a hose and a coupled connector. The coupled connector used is usually referred to as a locking cam lever coupling or cam-lock connector. Other connections are usually made with some type of union connector. The connection is made by mating two flat surfaces with a screw cap and an "O" ring or a metal-to-metal connection, thus providing a seal.

Couplings or connectors currently used in industry and that are widely known to those having ordinary skill in the art of couplings and material transfer are usually made of polypropylene (plastic), stainless steel, aluminum, brass, or similar materials. However, the majority of the materials employed are polypropylene or a similar polymer, aluminum, or stainless steel due to compatibility issues associated with a wide variety of chemicals and the other materials that are used in couplings or connectors.

The locking cam lever coupling devices and union connectors currently used and known by those who have ordinary skill in the art are available in sizes ranging from ½ inch threaded pipe to as large as industry requires. All of the currently used units have one substantial advantage, which is the use of a universal coupler. All locking cam devices mate into other locking cam devices as long as the correct sized device is used. Currently, all unions of the same size of locking cam device mate correctly, although different type threads on the screw cap hinder the connection. Currently, no right or wrong method of making a connection exists, and it does not matter which side of the locking cam lever coupling device faces up or which side faces down.

All of the locking cam lever coupling devices currently known and used have a major flaw. The devices consist of a universal coupler, i.e. it is possible to connect and transfer any material into any container or tank via the universal coupler, whether the material is safe or is the correct type of material to be introduced into the container or tank. The possibility of introducing an unsafe or incompatible material into a tank or container has created substantial problems over the years because when some chemicals are mixed violent exothermic reactions result that cause tank explosions or complete tank meltdowns. Mixing acids with oxidizers has also created gaseous clouds leading to extremely hazardous environments. Some improper mixing has even led to personnel deaths. Still other mistakes have ruined entire tanks of material. The cost to correct one of these improper mixing events can be tens of thousands of dollars up to multimillions of dollars if the event leads to serious injury or death of personnel.

The material transfer system and method of transferring materials comprising connectors and method of transferring material of the present invention comprising providing improved connectors overcomes the deficiencies of the connectors currently used. The connector and method of connecting of the present invention comprises a fool-proof method of connecting and a method of ensuring the safe and accurate transfer of materials.

The connector of the present invention comprises a plurality of male and female connector portions comprising a plurality of geometric shapes. The connectors of the present invention are shaped differently from any connectors currently available on the market. Each geometric shape comprising the present invention corresponds to a general class of chemicals One embodiment of the present invention connector comprises a color coded element according to the shape, size, and configuration of the connector and the material the connector is intended to transfer. The connector comprises a seal or "O" ring disposed on the connector that is chemically and mechanically compatible with the material being transferred. A marking or label that describes the material to be transferred is disposedly attached to the connector to improve safety and accuracy of the method of transfer of the material.

The present invention also comprises a plurality of indentations disposed on the male connector portion that correspond with projections disposed on the female connector portion. The indentations and projections are tightly mated, resulting in safety improvements because it is impossible to connect a male and a female portion if the indentations and projections do not tightly mate. The present invention comprises indentations and projections designed and manufactured to result in a unique connector apparatus that safely transfers a unique material or chemical according to the configuration of and labeling disposed on the connector apparatus. The present invention comprises a plurality of connectors, each comprising a unique "key." A unique number of uniquely and precisely located indentations and projections disposed on the connector comprises the key. The connector of the present invention prevents human error, improves safety at industrial sites, and saves expense to industry by modifying the connection devices as detailed.

The present invention revolutionizes safe material or chemical transfer. The connectors of the present invention are part of a safety check-off procedure that includes, but is not limited to, off-loading verification that ensures the correct material is being delivered; off-loading material verification that the material being transferred corresponds to the label that is disposed on and affixed to a tank or other container; verification that the correct female connector portion is disposed on the tank or container; and verification that the correct male connector portion is affixed to the container or pipe or other transfer mechanism that holds the material being delivered. The male connector portion is always disposed on the delivery system comprising a pipe or hose, and the female connector portion is always disposed on the container comprising a tank or other holding apparatus.

The male and female connector portions do not mate and no materials are transferred if the existing female connector portion disposed on the tank or container is connected with a male connector portion designed to be disposed on a material container different from the material that safely and correctly is contained in the material delivery tank or container. It is the responsibility of the loading operator to connect a transportable tank, tanker, tote, drum, or any other material transport container with the correctly keyed connector for the material being loaded. When these procedures are followed correctly it is impossible to transfer incompatible materials into existing locations. This procedure prevents material contamination and prevents potentially hazardous reactions from taking place when incompatible chemicals are mixed.

Currently used universal cam connectors and unions are provided with a factory-installed standard gasket. It is the responsibility of the end user to install the correct gasket if the factory-installed gasket is not compatible with the chemical being transferred. Often the end user does not know what type of gasket material is compatible with the material to be transferred.

Connectors of the present invention are provided to an end user with the correct gasket or "O" ring installed based upon the connector labels or markings and the material the connector is designed and engineered to transfer. The present invention more particularly comprises connectors wherein each connector is supplied to the end user with the correct gasket or "O" ring installed based upon the label disposed on the connector portions and the material the connector was engineered to transport. The present invention always comprises the correct gaskets or "O" rings supplied before being shipped from the manufacturer, when a connector of the current invention is engineered to transfer a specific chemical or material.

The present invention comprises connectors that ensure that the accidental transfer of a chemical, gas, or solid material into an incompatible tank or process is immediately apparent to be mechanically impossible. Safety is the primary component of delivering the material with correct seals, gaskets, and "O" rings comprising the delivered connector. Human error made by the transfer operator when transferring materials is therefore impossible.

The material transfer system and method of transferring material of one embodiment of the present invention is seen at http://kemkey.com/video.

SUMMARY

The present invention comprises a method for transferring material comprising the steps of inserting a male connector portion into a female connector portion comprising a connector, disposing the male connector portion against a seal, disposing pins in openings disposed in the female connector portion; pivoting cam locking levers around the pins, locking the male and female connector portions via disposing the cam locking levers in recesses, and transferring material through the connector from the pipe to the container.

The method for transferring material through the connector of the present invention further comprises visually verifying and matching the male connector portion label and the female connector portion label. The labels describe the material to be transferred.

The method for transferring material through the connector of the present invention further comprises making the connector material-tight.

The method for transferring material through the connector of the present invention further comprises matching keys comprising projections and indentations disposed on the male and female connector portions.

The method for transferring material further comprises attaching the female connector portion to a container. The method for transferring material further comprises attaching the male connector portion to a transfer hose. The method for transferring material further comprises disposing a lock in a loop and locking the female connector portion to the container The present invention comprises a material transfer system comprising a connector comprising a male connector portion and a female connector portion, a plurality of matching indentions and projections comprising keys disposed on said male connector portion and said female connector portion, a seal, cam locking levers, and aligning labels disposed on said male connector portion and said female connector portion, wherein the seal comprises an O ring compatible with any transferred material. The labels match and describe the material to be transferred.

The present invention comprises recesses disposed in the male connector portion, a loop comprising an opening, and pins disposed in openings disposed in the female connector portion, threads disposed in the male connector portion, and threads disposed in the female connector portion.

The present invention comprises an alternate embodiment comprising a material transfer system comprising a connector comprising a male union connector portion and a female union connector portion, keys comprising indentations and projections, a fastener that comprises a material-tight seal, and aligning and matching labels disposed on said male union connector portion and said female union connector portion, and a seal comprising an O ring that is of a material compatible with the material that is being transferred through the connector.

The alternate embodiment material transfer system further comprises a union slip end disposed at one end of the female union connector portion and a union slip end disposed at one end of said male union connector portion.

BRIEF DESCRIPTION OF THE SEVERAL VIEWS OF THE DRAWINGS

The accompanying drawings in the attachment, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings:

FIG. 10 is an end view illustration of the union connector embodiment disposed in a closed position.

DETAILED DESCRIPTION OF THE INVENTION

Figure 1:
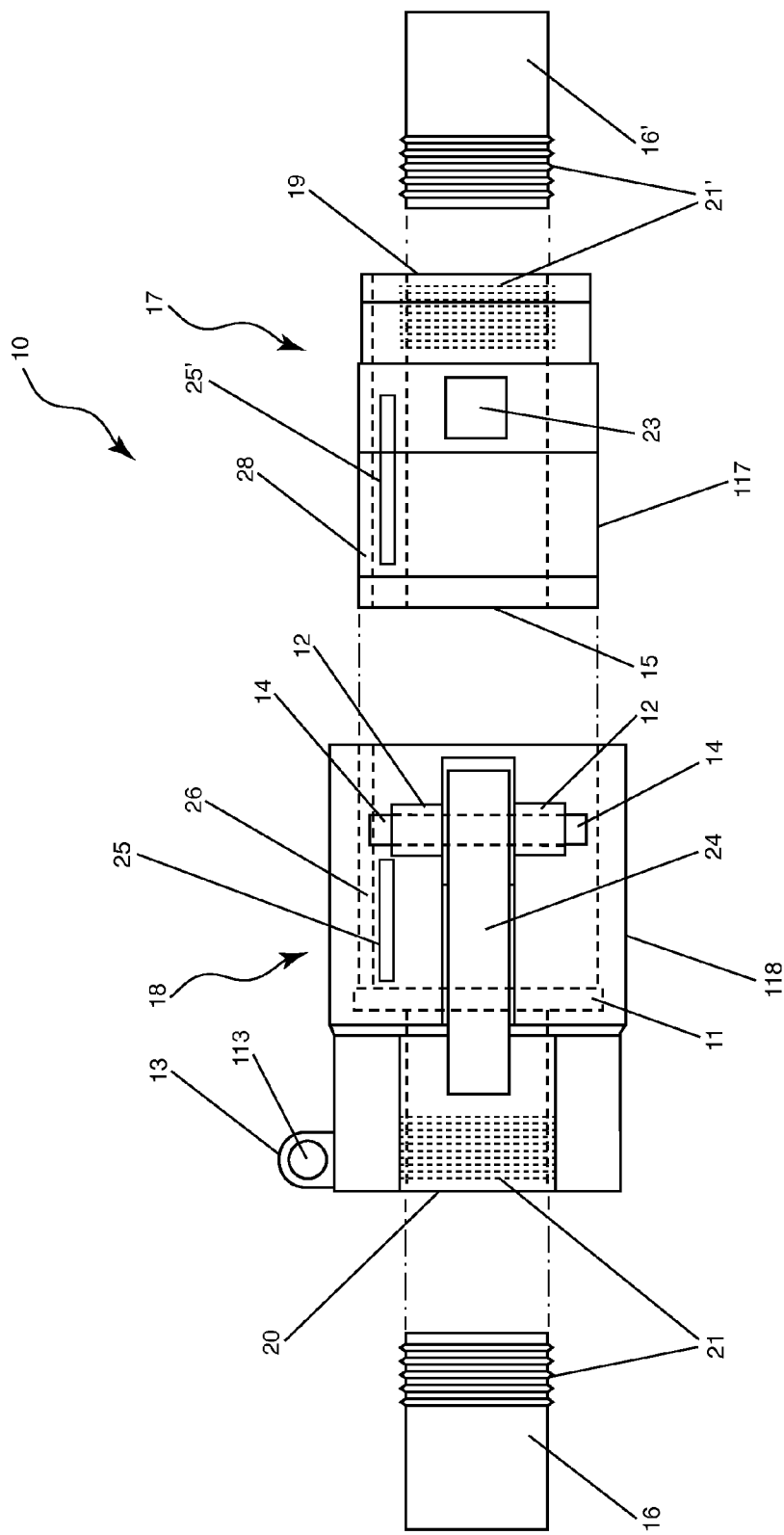
FIG. 1 is an illustration of a preferred embodiment of the present invention comprising a side view of a connector disposed in an open position, comprising a male connector portion and a female connector portion.

The material transfer system comprising a connector of the present invention is designed and constructed such that the male connector portion uniquely mates with the female connector portion of the connector. Recesses, which receive a cam element, ensure a tight, safe connection of the male and female portions of the connector, are disposed on sides of the male connector portion. Currently, connectors found in industry consist of a smooth ring that completely encircles the male portion of the connector that slides over the smooth circumference of a female portion. These currently known connectors are inadequate and unsafe because all materials can be delivered in any tank, no matter what material is to be delivered into a tank containing any material. The present invention addresses and overcomes these safety deficiencies.

The bottom configuration or design of both connector portions of the present invention differ from the top configuration or design of the connector portions so that the male connector fits into the female connector in one position only. The design and production of the male and female connector portions of the present invention are identically engineered so that the two connectors mate and form a leak or spill-proof seal.

The present invention comprises an apparatus that ensures safe chemical transfers by color coding of the plurality of elements of the invention based upon class of chemical, using compatible materials for sealing elements, labeling each connector correctly, and employing unique geometric shapes and a variety of configurations incised on the female and male connector portions comprising keys that are disposed on the connector elements so that incompatible and dangerous connects cannot be made.

The present invention comprises a method and apparatus that provides for a plurality of different configurations comprising indentation-projection key designs for each material in a material line based upon the formula and the general hazard of a material or chemical (giving color and geometric designs) that needs to be transferred. A material name is associated with a connector with unique key indentations and projections so there is no possibility that dissimilar or even somewhat similar materials are mixed accidently. The mixing of similar materials may not cause safety or health hazards, but the cost to dispose of unusable chemicals is substantial.

The following Table 1 lists a sampling of materials to be transferred, connectors comprising a connector color code, and a connector geometric shape that is used to differentiate the plurality of connectors of the present invention that are used to safely transfer a corresponding variety of materials. Connectors comprising the colors and geometric shapes are not inclusive of every connector required to transfer every chemical. Other connector shapes and colors are produced as needed or desired.

TABLE 1

Connector color and shape and material transferred by the connector of the present invention.

| MATERIAL | COLOR | GEOMETRIC SHAPE |
| --- | --- | --- |
| Flammable | Red | Octagon (8 sides) |
| Oxidizers | Green | Pentagon (5 sides) |
| Acids | Orange | Hexagon (6 sides) |
| Bases (caustic) | Blue | Square (4 sides) |
| Toxic (biocides, poisons) | Purple | Nonagon (9 sides) |
| Reducing Agents | Yellow | Heptagon (7 sides) |
| Carcinogens | Brown | Triangle |
| Corrosives | Gold | Oval top, Square bottom |
| Polymers (nonhazardous) | Teal | Oval |

The first following description describes the preferred embodiment of the present invention. Other embodiments are included subsequently in the written description.

FIG. 1 is an illustration of a preferred embodiment of the present invention comprising a side view of connector 10 disposed in an closed position comprising a male connector portion and a female connector portion whereby the female portion is disposed in a closed position. The male connector portion and the female connector portion seals when cam locking levers 24 and 24' are in a closed position. When cam locking levers 24 and 24' are in an open position, no seal exists.

FIG. 1 illustrates a male and female portion embodiment of the present invention connector. The exterior shape of this embodiment is for illustrative purposes only. Exterior shapes of connector embodiment 10 is any shape that is desired or needed to illustrate or identify any material or chemical that is to be transferred via the transfer system of the present invention.

Male connector portion 17 is disposed within female connector portion 18 when male connector portion 17 is inserted into one end of female connector portion 18. Male connector body comprising a specific three dimensional configuration 117 disposed within female connector body 118 comprising a specific three dimensional configuration comprises specific dimensions and configurations so that when male body 117 is disposed within female body 118, the fit provides a leak-proof seal when cam locking levers 24 and 24' (illustrated in FIG. 2) are rotated and inserted in recesses 23 and 23' (illustrated in FIG. 3) and thus locked. Female connector body 118 and male connector body 117 configurations correspond to the shapes listed in Table 1.

Cam recess 23 comprises any precisely engineered, designed, and shaped recesses introduced in male connector portion 17 via machining, casting, injecting or any other method. Cam recesses 23 and 23' are disposed such that cam locking levers 24 and 24' seat precisely within the recesses when male connector portion 17 is fully inserted into female connector portion 18.

The method of use of connector 10 comprises locking male connector portion 17 into place within female connector portion 18 when closing cam locking levers 24 and 24'. Male connector portion 17 is unimpedebly disposed within female connector portion 18 when cam locking levers 24 and 24' are opened. Male connector portion 17 is unimpedebly removed from female connector portion 18 when cam locking levers 24 and 24' are opened. Closed cam locking levers 24 and 24' lock male connector portion 17 in place within female connector portion 18 such that there is complete material-proof contact against seal 11. Cam locking levers 24 and 24' comprise a cam design and thus dispose face 15 of male connector portion 17 in a unique position tightly against seal 11. Seal 11 is comprised of the best material for the chemical or material being transferred and contacts the face of male connector portion 17 such that no material leaks between the seal, the female portion and the male portion of the connector.

Locking cam pins 14 and 14' are disposed in openings 12 and 12' and respectively connect cam locking levers 24 and 24' to female connector portion 18. Cam locking levers 24 and 24' rotate or pivot on locking cam pins 14 and 14' when locking male and female connector portions.

A method use of the present invention comprises rotating cam locking levers on locking cam pins and then locking cam locking levers after fully inserting the male connector portion in the female connector portion and the male connector portion compresses seal 11, thus providing a safe seal.

Labels 25 and 25' are disposed on male connector portion 18 and female connector portion 17, respectively. Labels 25 and 25' are disposed on male connector portion 17 and female connector portion 18 to add to safety because both label's wording are identical adding another level of protection so that incompatible materials will not be transferred. Labels 25 and 25' align when cam levers are locked in place and a tight seal is formed. In the present invention labels comprise the following information: the labels are colored as follows: orange for acids, green for oxidizers, red for flammable liquids, blue for basic solutions (high pH), purple for toxic solutions (poisons or irritants), yellow for reducing agents, and brown for carcinogens. Chemical blends are classified by the most hazardous classification. For example, low pH solutions are classified as acids, high pH solutions are classified as bases, oxidizing biocides are classified as oxidizers. Gases normally use a union type connector to connect a cylinder to its eventual usage point. Examples of colors that indicate gases comprise red for acetylene and green for chlorine gas. The union-type connector is described later in the specification as connector embodiment 100.

Labels 25 and 25' contain information including but not limited to type of material to be transferred, material name, and chemical blend. Information that is included on both label 25 and label 25' is identical to further verify mating female and male connector portions, thus increasing safety. The labels on both the male and female connector portions provide a transfer operator or any other authorized personnel with additional information ensuring that incompatible materials are not being mixed. Labels 25 and 25' also are employed as aligning guides. Aligning labels 25 and 25' help operators align the male and female connectors' configuration variations comprising keys to simplify connecting.

A method of operation employing the present invention comprises an operator inserting the male connector portion into the female connector portions of the connector, observing that the words or descriptions on the two labels are identical and aligned, matching the respective keys, locking the cams, and thus finally locking the male end portion into the female end portion of the connector. Therefore the person transferring materials does not have to closely inspect the male portion of the connector, or the female portion of the connector because the keys align and match, and thus saves time, confusion, and frustration on the part of the operator and further decreases a chance of error and a resulting accident.

Configuration 28 incised in body 117 of male connector portion 17 of connector 10 comprises a precisely designed indentation introduced into male connector portion 17 via a variety of techniques, as appropriate to the type of material of the connectors. Configuration 28 comprising one portion of a key along with matching configuration 26 introduced in body 118 of female connector portion 18 of connector 10 starts its incision at face 15 of male connector portion 17 and extends within male connector portion 17 to at least the distance that the male connector portion is inserted into female connector portion 18. The width and depth and shape and size of configuration 28 is designed and constructed to precisely correspond to the shape and size and width and depth of projection 26 thus comprising a key.

A key is an element comprising a shape and size that provides connection with another key element and here, is individualized for the material being transferred. Configuration 28 comprises one or more indentations comprising a plurality of shapes and sizes dependent upon the exact design of the connector desired. A plurality of embodiments of the connector of the present invention comprises a plurality of matching configurations 28 and 26 comprising a key to accommodate the safe transfer of a plurality of materials comprising chemicals or chemical blends.

A portion of the key disposed on female connector portion 18 comprises configuration 26. Configuration 26 disposed in body 118 of female connector portion 18 mates precisely with configuration 28 disposed in body 117 of male connector portion 17. Configuration 26 comprises one or more projections or indentations of any shape that precisely mate with configuration 28 indentations or projections that are identically shaped to configuration 26 projections or indentations disposed in male connector portion 17. The number and size of projections and indentations match exactly in appropriately mated male and female connector portion pairs of connector 10. The indentations and projections are disposed and aligned so that the two connector portions align and fit exactly thus forming a tightly sealed connector that safely transfers materials.

Threaded conveyance pipe 16' comprises a male threaded fastener comprising threads 21' that attaches to male connector portion 17 at threaded end 19 of male connector portion. Threaded conveyance comprising a pipe 16 comprises a male threaded fastener comprising threads 21 that attaches to female connector portion 18 at threaded end 20 of the female connector portion. Pipe 16 is attached to a tank or container. Threaded conveyance pipes 16 and 16' comprise a pipe or hose or any other type of conveyor of materials.

For different materials within the same class the present invention provides alternate embodiments that comprise alternate configurations and numbers of keys introduced in or disposed on the female and male connector portions of connector 10. Additional keys are added to make the connector configuration more complex and thus to provide additional connectors to provide additional capabilities to transfer additional chemicals. For example, labeling on the connector of the present invention for each acid differs so that a transfer operator clearly observes which connector is designed for transfer of a specific acid. The male connector cannot be disposed within an incompatible female connector because the indentations and projections do not match correctly. If the transfer operator for some reason does not observe the labeling and attempts to connect a connector of the present invention to an incompatible storage vessel then the connection cannot take place. Only matched male and female connector portions allow a material transfer to take place.

Each chemical to be transported is assigned to a specific key design that comprises one or more projections disposed in the female connector portion that matches a corresponding indentation in the male connector portion. For example, a specific key design does not accommodate the introduction of sulfuric acid into a nitric acid tank even though both tanks have the same color coded connectors and the same general geometric design because the key designs are different. The present invention provides a design that ensures that each chemical has its own unique design or key so that incompatible transfer connectors simply cannot connect.

Color-coded connectors of the present invention comprise a plurality of keys. The number of keys that are available for use in the present invention to transfer chemicals currently used in industry is numerous. Keys comprising indentations and projections include, but are not limited to, rounded or sharp edged triangles, squares, pentagons, hexagons, heptagons, nonagons, decagons, rounded 5-point stars, and 6-point stars. Non-symmetrical designs are also possible.

The connector portions are tinted or alternately are colorless thus providing color coding as needed to improve safety. The color chosen is based on the hazards of the chemical transferred or handled. Non-limiting examples of color-coding comprise red for flammable materials, orange for acids, green for oxidizers, and blue for bases. The color-coding ensures that the connectors comprising this invention serve as a readily apparent indication of the type of chemical transferred. For example, if a spill occurs and the fire department is called to the scene, the firefighters quickly recognize the general hazard of the spill by looking for the color of the connector used to transfer the material. Firefighters alternately use binoculars to make the determination from a reasonable distance before coming into contact with the spill.

The unique geometric shapes and color coding described previously comprise an invention and a method of use that connects containers or tanks and pipes or hoses in a fashion similar to the way a door lock connects to a door key. A transfer operator who is using the present invention to transfer a material looks at the two ends of the transfer apparatus and identifies that the correct connector for completing the material transfer is available. A connection cannot be completed if a transfer operator does not recognize that the connectors are matched pairs. The connectors only mate if the material to be transferred (the male connector portion is attached to the pipe or hose) is identical to the material disposed in an on-site tank or container (the female connector portion is attached to the tank).

Figure 2:
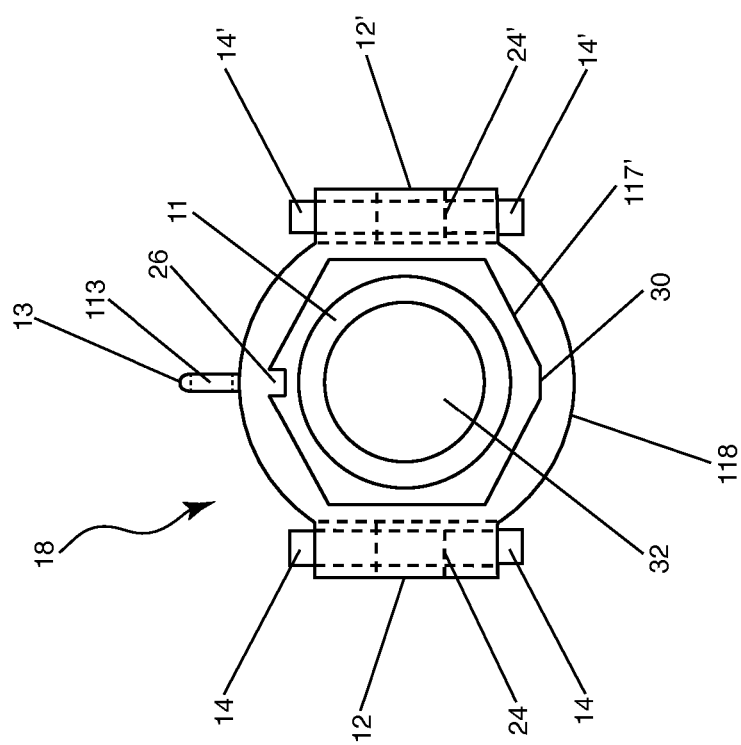
FIG. 2 is an illustration of an end view of the female connector portion of the connector of the present invention in the closed position.

FIG. 2 illustrates an end view of connector 10 of the present invention comprising the female connector portion with the cam locking levers in a closed position. FIG. 2 illustrates female connector portion 18 comprising female connector body 118. The specific shape as illustrated by female connector body 118 in FIG. 2 is illustrative only. Female connector body 118 comprises any geometric shape needed to identify a class of liquid, gas, or solid that passes through bore 32 which is disposed in female connector portion 18.

Loop 13 comprising opening 113 is disposed on female connector portion 18 and is engineered, designed, and configured as an element of female connector portion 18.

The surface 117' of bore 32 is shaped the same shape as male body 117. Bore 32 disposed in female connector portion 18 provides transfer of liquid, gas, or solid material through female connector portion 18 from bore 44 disposed in male connector portion 17 and thus comprises a passage through the connector. Bore 32 disposed in female connector portion 18 comprises approximately the same internal diameter as the internal diameter of threaded pipe 16.

Seal 11 is disposed adjacent to one end of the interior of female connector portion 18 and provides an excellent seal when male connector portion 17 is disposed within bore 32. Seals comprise any material that is compatible with the material or chemical transferred.

Figure 3:
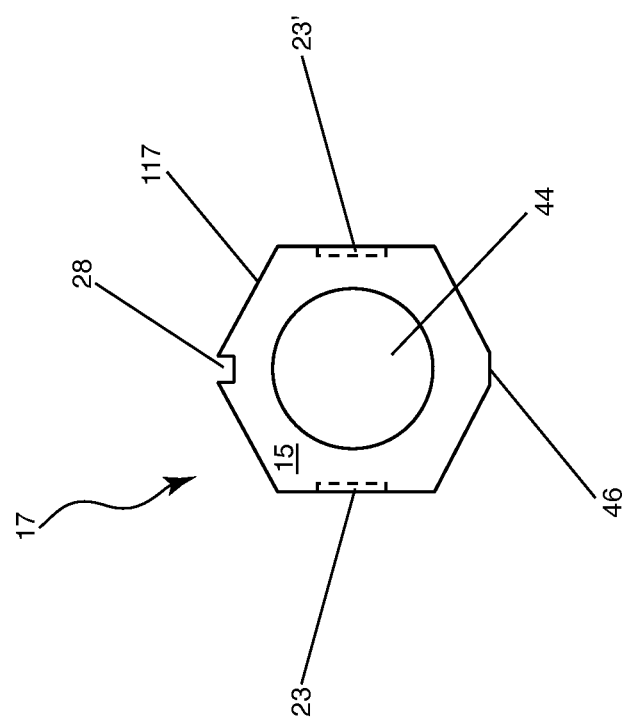
FIG. 3 is an illustration of an end view of the male connector portion of the connector of the present invention.

FIG. 3 is an illustration of an end view of male connector portion 17 of connector 10 of the present invention. FIG. 3 illustrates male connector body 117 of male connector portion 17. The shape of male connector body 117 is illustrative only. Male connector body 117 comprises any three-dimensional geometric shape desired and comprises an individualized geometry for each class of liquid, gas, or solid that passes through bore 44 disposed in male connector portion 17. Male connector body 117 corresponds to female connector casing or body 118 as illustrated in FIG. 2; body shapes are identical when material is transferred correctly and safely.

Surface 46 matches surface 30 in size, shape, and dimension. Surface 46 disposed on the surface of male connector portion 17 comprises a surface resulting in an asymmetrically shaped male connector portion and provides for a greater variety of shaped connectors 10. Surface 46 and the shape of 117 are for illustrative purposes only. Surface 46 and the shape of 117 are any shape or configuration desired, as long as they match the corresponding surface 30 and shape 118 of the female connector portion of connector 10, respectively. Additionally, it is impossible to rotate male connector portion 17 comprising surface 46 180 degrees and dispose within bore 32 of female connector portion 18 due to key configuration and the presence of surfaces 46 and 30.

Surface 30 as illustrated in FIG. 2 is disposed on the inner diameter of female connector portion 18 and comprises a flat surface adjacent to the hexagonally-shaped inner diameter, and results in an asymmetrically shaped female connector portion and provides for a greater variety of connectors 10. Surface 46 is aligned with surface 30 and the two female and male connector portions are thus sealed with a material-tight, fool-proof seal when the present invention is employed. The surfaces 30 and 44 prevent male connector portion to be turned 180 degrees and redisposed within the female connector portion in an incorrect position Male connector portion 17 comprises a polygonal-shaped body 117 comprising cam recess 23 and cam recess 23'. Cam locking levers 24 and 24' are disposed within cam recess 23 and cam recess 23' respectively when cam locking levers 24 and 24' are in the closed position, resulting in male connector portion 17 locking into female connector portion 18 and producing a material-tight seal.

Opening comprising bore 44 disposed in male connector portion 17 provides for the transfer of liquid, gas, or solid material through male connector portion 17 into and through female connector portion 18. Bore 44 disposed in male connector portion 17 is an element of the passageway through connector 10. Bore 44 diameter in male connector portion 17 comprises approximately the same internal diameter of threaded pipe 16' and internal bore 32.

Threaded end 19 (as illustrated in FIG. 1) of male connector portion 17 attaches to a pipe or hose or any other conveyor of materials. Here, threaded end 19 of male connector portion 17 comprises male or female pipe threads 21' or alternately a barbed end such as the kind currently used on hoses using hose clamps. Threaded end 19 of male connector portion 17 accepts threaded pipe 16'.

Threaded end 20 of female connector portion 18 comprises the end of the female connector portion 18 where the connector is attached to a pipe or hose or any other type on conveyor of materials 16 which is then connected to a container. Here, threaded end 20 of female connector portion 18 comprises male or female threads 21 or alternately some variety of barbed end such as the kind currently used on hoses using hose clamps. Threaded end 20 of female connector portion 18 accepts threaded pipe 16.

Face 15 of male connector portion 17 is comprised of a preferably flat surface (as illustrated in FIG. 3) that is disposed adjacent to and compresses seal 11. Face 15 of male connector portion 17 is engineered and manufactured to prevent leakage when male connector portion 17 enters female connector portion 18 and is locked in place using cam locking lever 24 and 24'. The levers, when closed, precisely dispose male connector 17 adjacent to compression seal 11 to provide a material-proof seal.

Figure 4:
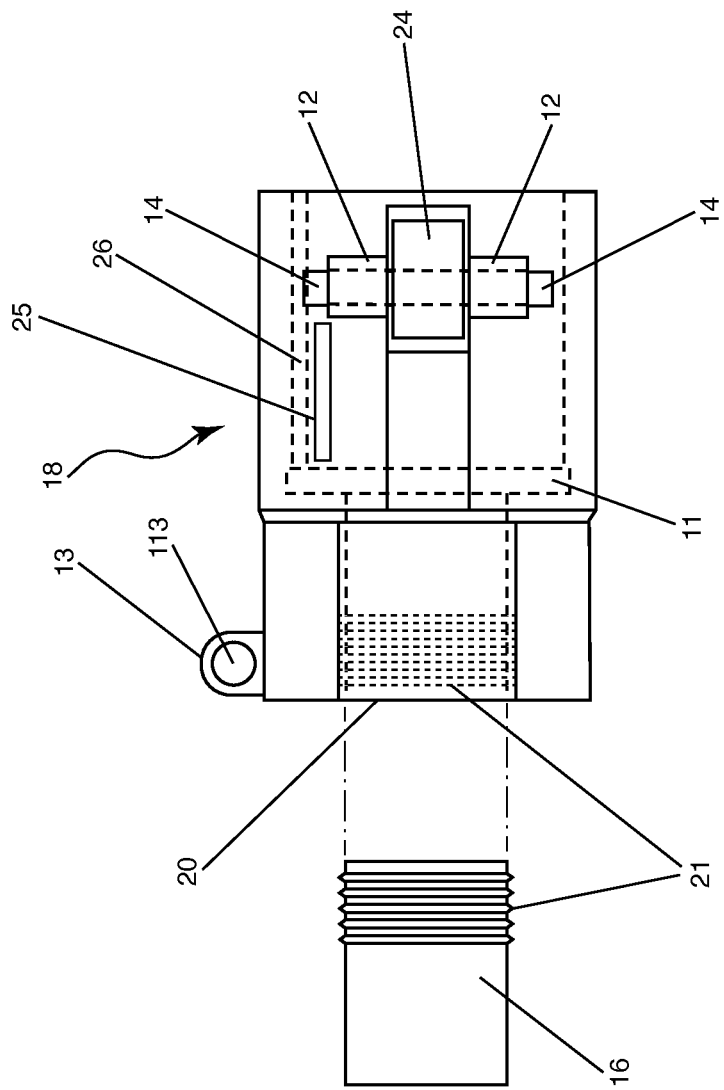
FIG. 4 is an illustration of a side view of the female connector portion with the cam locking lever disposed in an open position.

FIG. 4 is an illustration of a side view of female connector portion 18 with the cam locking lever disposed in an open position. Cam locking levers 24 and 24' (illustrated in FIG. 2) are disposed in a position perpendicular to the plane of the figure and rotate on locking cam pins 14 and 14' respectively. Locking cam pins 14 and 14' are disposed in openings 12 and 12' (illustrated in FIG. 2). Seal 11 comprises a material that is the most compatible, according to industry standards, to the material transferred through connector 10. Seal 11 is disposed in female connector portion 18. In the existing configuration currently in use in industry, connectors use a standard generic seal that may not be compatible with the actual intended use of a transported material. This invention comprises connectors that always have a seal installed that is compatible with the material to be transferred, and therefore is an improvement on connectors currently used.

Locking cam pins 14 and 14' (illustrated in FIG. 2) comprise a pin that connects cam locking levers 24 and 24' to female connector portion 18 via locking cam pins being seated in openings 12 and 12'. Locking cam pins 14 and 14' are disposed in female connector portion 18. Cam locking levers 24 and 24' when rotated about pins and then disposed in cam recess 23 (as shown in FIG. 3) provide for cam locking levers 24 and 24' to insert male connector portion 17 into female connector portion 18.

The method of transferring material comprises inserting locking cam pins 14 and 14' through female connector portion 18 at openings 12 and 12'. Locking cam levers 24 and 24' fit tightly in the recesses when disposed in the locked position. Openings 12 and 12' are positioned so that disposing cam locking levers 24 and 24' adjacent to female connector portion 18 and inserting cam locking levers into cam recess 23 is achievable. Locking cam pins 14 and 14' secure cam locking levers 24 and 24' and provide free movement of cam locking levers 24 and 24'.

Loop 13 comprises opening 113 and is disposed on female connector portion 18. Loop 13 comprising opening 113 provides a method to lockably connect female connector portion 18 to threaded pipe 16, or any other conveyance apparatus including but not limited to a valve or brace. A lock is disposed through opening 113 and through another loop or opening disposed on the material conveyance apparatus comprising pipe 16. Loop 13 along with an end user supplied lock prevents unauthorized removal of the connector of the present invention.

Chemical transfer operators in the past have unsafely and incorrectly used a pipe wrench to remove a connector that is locked or does not fit the type of transfer connection. To prevent this and similar types of unsafe action, the connector of the present invention comprises loop 13 disposed on the female connector portion. A padlock is placed through opening 113 disposed in loop 13 and into a brace or a similar connection disposed on threaded pipe 16 comprising any conveyance apparatus including but not limited to a valve or brace so that removal of the connector of the present invention is impossible without an authorized key.

Figure 5:
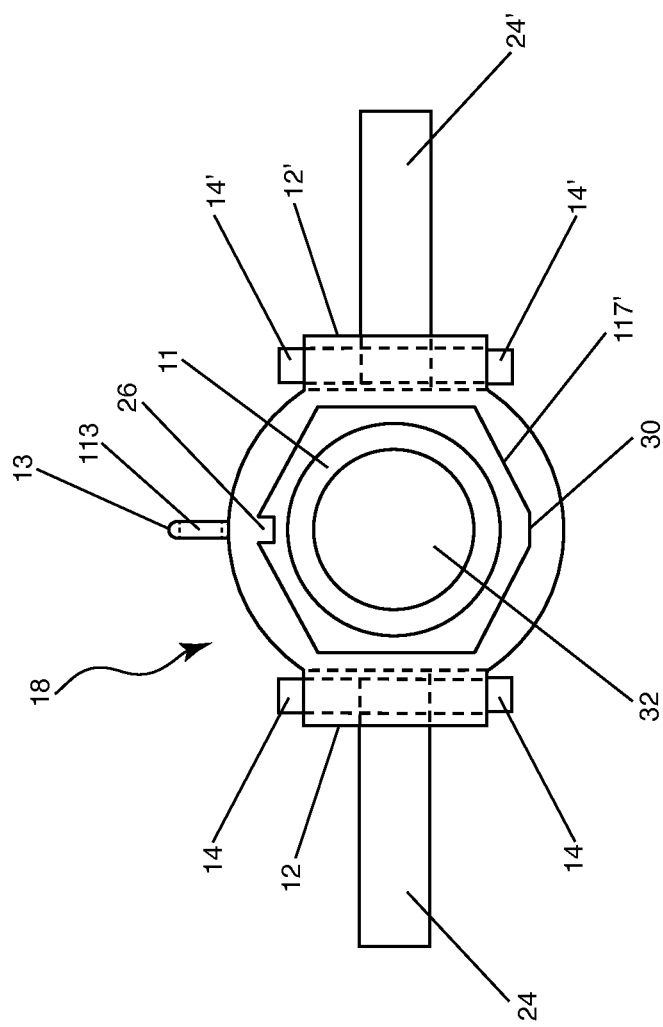
FIG. 5 is an illustration of a end view of the female connector portion with the cam locking lever disposed in an open position.

FIG. 5 is an illustration of an end view of female connector portion 18 with the cam locking lever disposed in an open position. All elements correspond to FIG. 3 which illustrates an end view of female connector portion 18 with the cam locking lever disposed in an closed and locked position.

Figure 6:
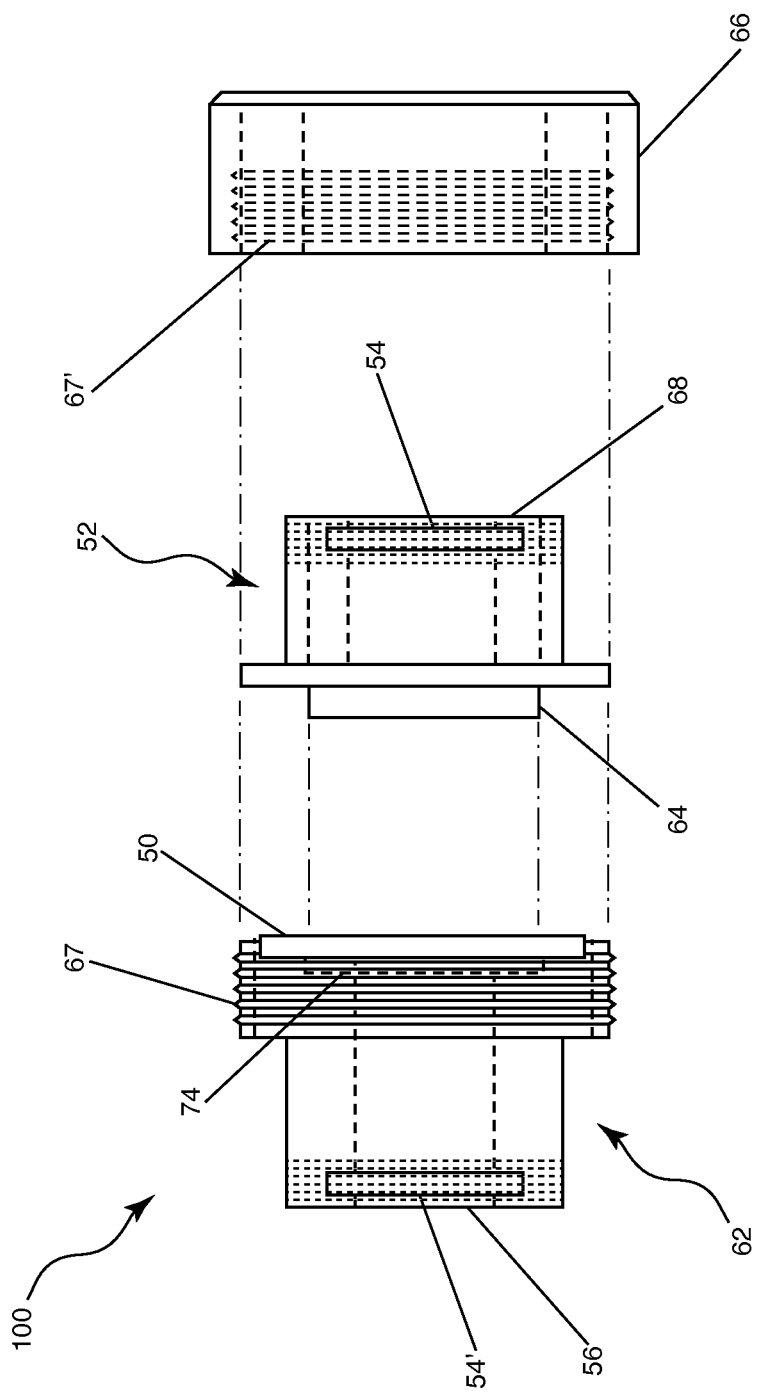
FIG. 6 is an illustration of an alternate embodiment of the present invention comprising an expanded side view of a union connector.

FIG. 6 is an illustration of an alternate embodiment of the present invention comprising a side view of union connector 100 comprising a male union connector portion, a female union connector portion, and a fastener. FIG. 6 illustrates how the portions connect and seal employing a fastener. Male union connector portion 52 mates with female union connector portion 62 when the two union connectors are disposed adjacently. Male union connector portion 52 mates with female union connector portion 62 and is thus verified that the two union connector portions are the same size and configuration.

Male union connector portion 52 and female union connector portion 62 are fastened with fastener 66 comprising a threaded 67' nut which screws onto threads 67 disposed on female union connector 62 to form a leak-proof seal. Fastener 66 is disposed on male union connector portion 52 and threads onto female union connector portion 62 and thus tightly seals male union connector portion 52 and female union connector portion 62 together. This connection forces the flat areas of the two connectors against seal comprising "O" ring 50 to make a material-proof seal. Fastener 66 comprises a round threaded nut, a hex-shaped threaded nut, and is tightenable by a wrench. Fastener 66 is alternately hand-tightened.

Labels 54 and 54' contain information including but not limited to type of material to be transferred, material name, and chemical blend. Information included on labels 54 and 54' is identical to each other to further verify mating female and male connector portions. The labels on both the male and female connector portion provide the transfer operator with additional information ensuring that incompatible materials are not and will not be mixed. Labels are disposed adjacent to threaded end 56 of union female connector and adjacent to threaded end 68 of union male connector. Union male projection 64 is disposed on male union connector portion 52. Union seal 50 comprises a seal disposed on the female union connector 62. Union seal 50 comprises a material compatible with the chemical that is being transferred through the connector.

Male union connector portion 52 comprises union slip end 68 or alternately a threaded end which is disposed at one end of male union connector portion 52 where the connector is attached to a pipe or hose or other conveyance fixture. Male union connector portion 52 comprises union threaded end 68 comprising a male or female pipe thread or a barbed end that is commonly used on hoses using hose clamps.

Female union connector portion 62 comprises union threaded or alternately slip end 56 which is disposed at one end of female union connector portion 62 where the connector is attached to a pipe or hose or other conveyance fixture. Female union connector portion 62 comprises union slip end 56 or alternately a threaded end comprising a male or female pipe thread, glued or sweated smooth pipe, or a barbed end that is compatible with hoses using hose clamps.

Figure 7:
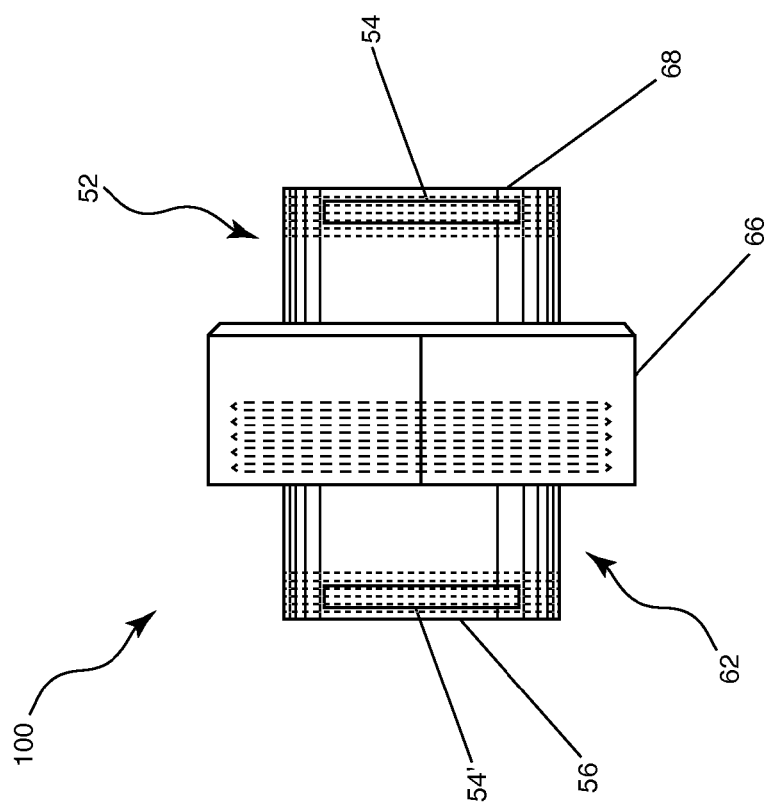
FIG. 7 is a side view illustration of the union connector embodiment in a closed and sealed disposition.

FIG. 7 illustrates a side view of the union connector embodiment previously shown in FIG. 6 disposed in a closed position. FIG. 7 illustrates union connector embodiment 100 comprising male union connector portion 52, female union connector portion 62, and fastener 66 connected and locked.

Figure 8:
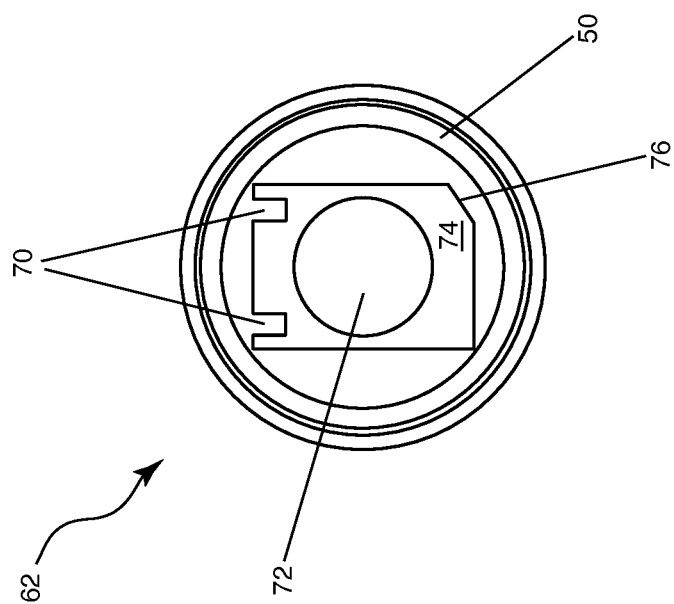
FIG. 8 is an illustration of a end view of the female connector portion of the union connector embodiment.

FIG. 8 is an illustration of a end view of the female connector portion of the union connector embodiment. FIG. 8 illustrates an end view of female union connector portion 62 comprising female union indentation 74. Female union indention 74 and union male projection 64 (as illustrated in FIG. 6) fit snugly and create a key. A plurality of geometric shapes are used to correspond to classes of materials being transferred through the connector as described. The geometric shape disposed in female union indention 74 is the same as the shape of union male projection 64 and thus forms a tight seal when the two parts are connected.

Figure 9:
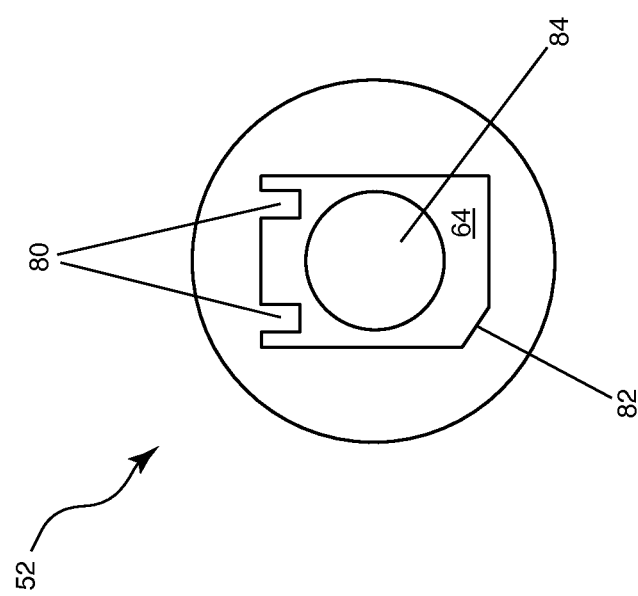
FIG. 9 is an illustration of a end view of the male connector portion of the union connector embodiment.

Surface 76 disposed on the surface of female union connector 62 comprises a flat surface resulting in a preferably asymmetrically shaped female connector and provides for a greater variety of union connectors 100. Surface 76 is aligned with union area 82 (as illustrated in FIG. 9) disposed on the surface of male union connector portion 52 when the two connector portions are disposed adjacently providing a material-tight seal. Surface 76 ensures that if male union connector portion 52 is rotated 180 degrees it cannot be inserted into female union connector portion 62. The inability to dispose the male union connector within the female union connector in multiple positions thus comprises a key. This key is an important and integral element of the present invention.

Union configurations 70 comprises a set of projections or indentations disposed on female union connector 62 that corresponds to the union set of projections or indentations 80 (as shown in FIG. 9) disposed on male union connector portion 52. The protrusions and indentations provided by elements 70 and 80 correspond exactly in number, shape, depth, and width and thus form a key mechanism. Shape and geometry of elements 70 and 80 are illustrative only in the figures. The present invention comprises a plurality of shapes and geometries of elements 70 and 80.

Union seal 50 as shown in FIG. 8 is disposably attached to female union connector 62. Union seal 50 comprises a material that is most compatible, according to industry standards, to the material transferred through alternate embodiment union connector 100. In the existing configuration currently in use in industry, connectors use a standard generic seal that may not be compatible with the actual intended use of the transferred material. This invention comprises connectors comprising union seal 50 that is always compatible with the material to be transferred. Union seal 50 surrounds union geometric shaped female union indention 74. The face of male union connector portion 52 when disposed adjacent to union seal 50 and placed under pressure creates a seal. The pressure is generated by screwing fastener 66 (illustrated in FIG. 7) onto female union connector portion 62.

FIG. 9 is an illustration of an end view of embodiment 100 of the present invention comprising male union connector portion 52. Union male projection 64 comprises a projection that is comprised of a plurality of geometric shapes including but not limited to squares, ovals, hexagons, octagons, or pentagons. Each geometric shape is individualized for each class of liquid, gas, or solid or any material that is to pass through male union connector portion 52 and through union geometric shaped female union indention 74. The geometric shape that encompasses union geometric shaped union male projection 64 is identical to the geometric shape found in the union geometric shaped female union indention 74 (as illustrated in FIG. 8). Union bore 84 disposed through male union connector portion 52 provides for the transfer of any liquid, gas, or solid material through male union connector portion 52 from female union connector portion 62.

Union configuration 80 is disposed adjacent to male union configuration 70; both elements match. Indentation 74 matches union male projection 64. Union male projection 64 comprises the male portion of the union fitting that is projecting out so that it fits into the female portion. Union configurations 70 and 80 comprise one or more indentations and projections dependent upon the exact design of the connector desired. Specialized connectors corresponding to this invention with a plurality of union configurations 80 and corresponding union configurations 70 are aligned with specific materials, chemicals or chemical blends. Union bore 72 disposed in female union connector portion 62 provides for the transfer of liquids, gases, or solid materials to pass through female union connector portion 62 from male union connector portion 52.

No two keys are exactly the same even when the connectors are different colors and are labeled for different materials. Each chemical or material is transferred safely via an individual connector, which eliminates the possibility of operator error and willful tampering, due to the plurality of geometric shapes of the connectors and the plurality of dispositions of the projections and indentations.

Surface 82 disposed on a surface of male union connector portion 52 preferably comprises a flat surface resulting in an asymmetrically shaped male union connector portion 52 and provides for a greater variety of union connectors 100. Surface 82 is aligned with and corresponds to surface 76 disposed on the surface of female union connector portion 62. When the two connector portions are aligned and disposed adjacently, the portions form a material-tight seal.

FIG. 10 is an end view illustration of union connector embodiment 100 disposed in a closed position. Union connector 100 comprises a male connector portion, a female connector portion, and a fastener. The male and female components of the union fitting are adjacently disposed, and as shown in the figure, the fastener has been tightened and thus the connection is secure. Union bore 90 disposed within union connector 100 comprises an opening disposed within union connector 100 after male union connector portion 52, female union connector portion 62, and fastener 66 are connected. Union bore 90 comprises an opening that allows material to pass through connector during the transfer process.

Example 1

One embodiment of the present invention comprises a connector for nitric acid transfer. The nitric acid connector used in this example was orange, and labeled "nitric acid," and was provided with the correct gasket or O ring, was of a hexagonal shape, and the keys on the connector portions consisted of indentations disposed in the center top and also the center bottom of the connector portions, where the indentations were aligned. The key design prevented any other acid, such as sulfuric acid, from being installed into a nitric connector.

The female connector portion of the nitric acid connector of the present invention was connected to a fitting attached to a customer's storage tank. Delivery of nitric acid was made using the male connector portion of the nitric acid connector, which was attached to a hose which was attached to a delivery truck tank. All participants involved in the delivery process knew exactly what was required for the safe transfer of the nitric acid, due in part to the labeling on the connector portions.

A lock was disposed through the tank brace and through the loop located on the female connector portion of the connector, which ensured that the connector could not be removed and replaced with a universal coupling, or an incorrect connector of the present invention.

Two people on site verified connector labels and delivery paperwork and adhered to site chemical transfer procedures. The male connector portion was verified at the site entrance and thus ensured that the correct chemical was delivered. No universal adapters were allowed on site.

The preceding example can be repeated with similar success by substituting generically or specifically described operating conditions of this invention for those used in the preceding example.

Although the invention has been described in detail with particular reference to these preferred embodiments, other embodiments can achieve the same results. Variations and modifications of the present invention are obvious to those skilled in the art and it is intended to cover all such modifications and equivalents.

What is claimed is:

1. A material transfer system comprising:
   a connector comprising a male connector and a female connector;
   the male connector comprising a male connector body with a face end and a second end comprising a connection to a material conveyance fitting and the female connector comprising a female connector body with a receiving end with a recess for the male connector body a second end comprising a connection to a material conveyance fitting;
   the male connector having a bore axially located from the face end to the second end;
   the female connector having a bore axially located from the receiving end to the second end;
   the male connector body comprising at least one keyway;
   the female connector body comprising at least one key wherein the keyway matches the keyway of the male connector body;
   the female connector portion comprises an identical but countersunk key shape extending from the external face to the internal recess disposed on the interior surfaces of the female connector portion;
   a seal located within the receiving recess of the female connector body;
   and
   a means of locking the male connector into the female connector.

2. The material transfer system of claim 1, wherein the at least one keyway of the male connector body and the at least one matching keyway of the female connector body provide for a plurality of different configurations comprising indentation-projection key designs, wherein the indentation-projection key designs are selected from a group consisting of: an octagon, pentagon, hexagon, square, nonagon, heptagon, triangle, oval top-square bottom, or oval.

* * * * *